(12) United States Patent
Bos et al.

(10) Patent No.: US 6,460,264 B1
(45) Date of Patent: Oct. 8, 2002

(54) PART MEASUREMENT TEST FIXTURE

(75) Inventors: William R. Bos, Holland; Lee Oosterbaan, Hudsonville, both of MI (US)

(73) Assignee: Advantage Industries, Inc., Jenison, MI (US)

(*) Notice: Subject to any disclaimer, the term of this patent is extended or adjusted under 35 U.S.C. 154(b) by 0 days.

(21) Appl. No.: 08/709,462

(22) Filed: Sep. 3, 1996

Related U.S. Application Data

(60) Provisional application No. 60/003,121, filed on Sep. 1, 1995.

(51) Int. Cl.[7] .............................. G01B 5/00; G01B 5/20
(52) U.S. Cl. ............................. 33/549; 33/551; 33/553
(58) Field of Search ........................ 33/549, 551, 552, 33/553, 554, 555, 523

(56) References Cited

U.S. PATENT DOCUMENTS

| | | | |
|---|---|---|---|
| 2,360,754 A | * 10/1944 | Beckett .................... 33/549 |
| 3,440,738 A | * 4/1969 | Mangan .................... 33/554 |
| 3,594,909 A | * 7/1971 | Schultz .................... 33/552 |
| 3,597,849 A | * 8/1971 | Gaal ........................ 33/552 |
| 4,197,652 A | * 4/1980 | Qurnell et al. .......... 33/553 |
| 4,221,053 A | * 9/1980 | Bobel, II et al. ........ 33/552 |
| 4,679,331 A | * 7/1987 | Koontz .................... 33/551 |
| 5,276,974 A | * 1/1994 | Chanoni et al. ......... 33/554 |

FOREIGN PATENT DOCUMENTS

| GB | 2253700 | * 9/1992 | .................. 33/551 |
|---|---|---|---|
| JP | 85108 | * 5/1983 | .................. 33/551 |

* cited by examiner

*Primary Examiner*—Diego Gutierrez
*Assistant Examiner*—Mirellys Jagan
(74) *Attorney, Agent, or Firm*—Waters & Morse, P.C.

(57) ABSTRACT

A test fixture for rapidly checking the measurements of identical parts at various points on the parts comprises a mounting mechanism for mounting the part securely in a predetermined position; a rail or track defining a guide path that extends past selected points on the part; a car that is positioned on the guide path for movement past the selected points on the part; and an indicator mounted on the car for detecting the position of selected points on the part relative to selected locations on the guide path.

16 Claims, 4 Drawing Sheets

PART MEASUREMENT TEST FIXTURE

CROSS-REFERENCES TO RELATED APPLICATIONS

This is a continuation in part application of copending U.S. patent application Ser. No. 60/003,121, entitled PART MEASUREMENT TEST FIXTURE and filed on Sep. 1, 1995 by William Bos and Lee Oosterbaan, the disclosure of which is incorporated here by reference.

FIELD OF THE INVENTION

The present invention relates to a test fixture for rapidly and repeatedly measuring the dimensions of manufactured products at different specified locations on the products.

BACKGROUND OF THE INVENTION

Production parts or products in an assembly line are supposed to conform with the part dimensions contained in product specifications for the parts, at least within a specified tolerance range. During the manufacture of parts, many things can happen which cause the part sizes to vary beyond the tolerance limits. It is therefore necessary to measure the dimensions and the shape of test parts selected from the production line from time to time in order to determine if the parts still meet specifications. This is a time consuming and laborious process if done by hand with completely manual measuring devices. Moreover, the results are imprecise.

An object of the present invention is to provide a test fixture that can repeatedly, accurately and quickly take dimensional measurements off a test part at multiple locations on the part.

SUMMARY OF THE INVENTION

In accordance with the present invention, a test fixture for rapidly checking the measurements of identical parts at various points on the parts comprises: a mounting mechanism for mounting each part securely in a predetermined position; a rail or track defining a guide path that extends past selected points on the part; a movable car that is mounted on the rail for movement past the selected points on the part; and a position sensor or indicator mounted on the car for detecting the position of selected points on the part relative to selected locations on the guide path.

In the preferred invention, the part to be tested is mounted on a rigid mounting plate. A raised rail extends around at least a portion of the periphery of the part or mounting plate. A car is mounted on the rail for movement along the rail. A position sensor (indicator) attached to the car extends outward to contact the part and continuously provide a reading indicative of the relative position of the part as the car is moved on the rail around the periphery of the part. Dimensional measurements may be taken continuously or the car can be stopped at specified testing locations along the guide rail by a resilient stop mechanism such as a spring loaded ball bearing mounted to the bottom of the car that locates in machined indentations that are at specified intervals along the guide rail.

The sensor desirably is a probe that is urged outward to contact the part, such that the position of the probe is indicative of the position of the part where the probe engages the part. The probe can be aligned with the edge of the part so that the linear movement of the probe represents the position of the edge of the part. A pivot link can be attached to the probe so that the linear movement of the probe can also reflect the vertical position of the part.

The present invention comprises a testing mechanism that can accurately and rapidly measure the dimensions of a part at a number of locations on the part. This data can be stored and manipulated in a computer system so that compliance with tolerances can be continuously assured and so that any necessary modifications in the production process to maintain the product within tolerance limits can be implemented.

These and other features and advantages of the present invention will become apparent from the preferred embodiments described below and shown in the appended drawings.

DETAILED DESCRIPTION OF PREFERRED EMBODIMENT

Figure 1:
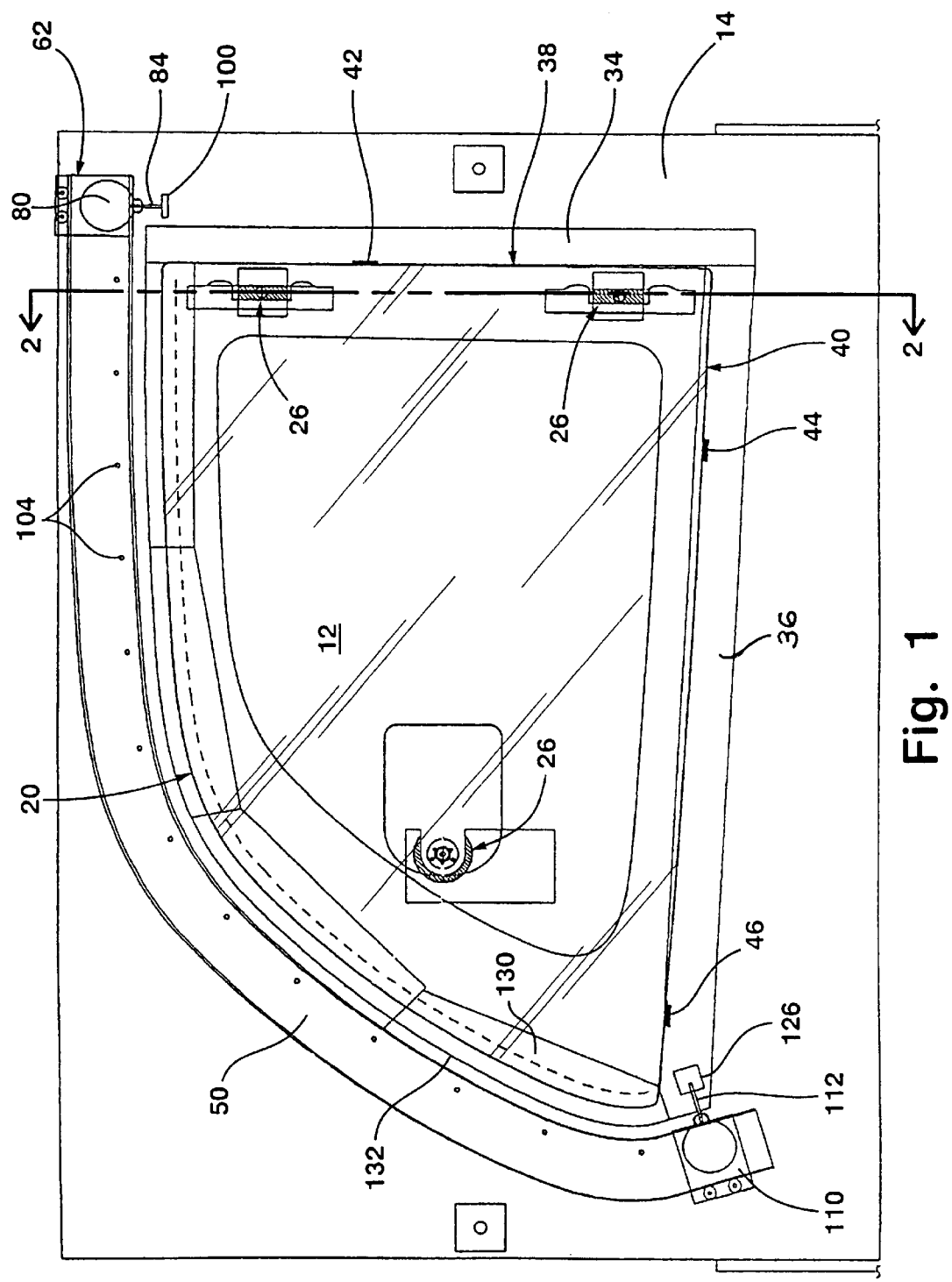
FIG. 1 is a plan view taken perpendicular to the mounting plate of the test fixture of the present invention.

Referring to the drawings, a test fixture 10 for measuring predetermined dimensions of a product 12 comprises a base 14 in the form of a solid plate mounted at an inclined angle on a fixed position table 16 and supported at an angle by vertical support arm 18 extending upward from the table.

In the present illustrated embodiment, the product or part 12 is a window of the type used in automotive applications. The window has an edge 20 and domed or arcuate surface 24. While a window or sheet-type product is shown in the illustrated embodiment, the apparatus of the present invention can be employed to take measurements from the contour of any type of product with an extended surface area. The present invention is not limited to a test fixture for measuring glass.

Figure 2:
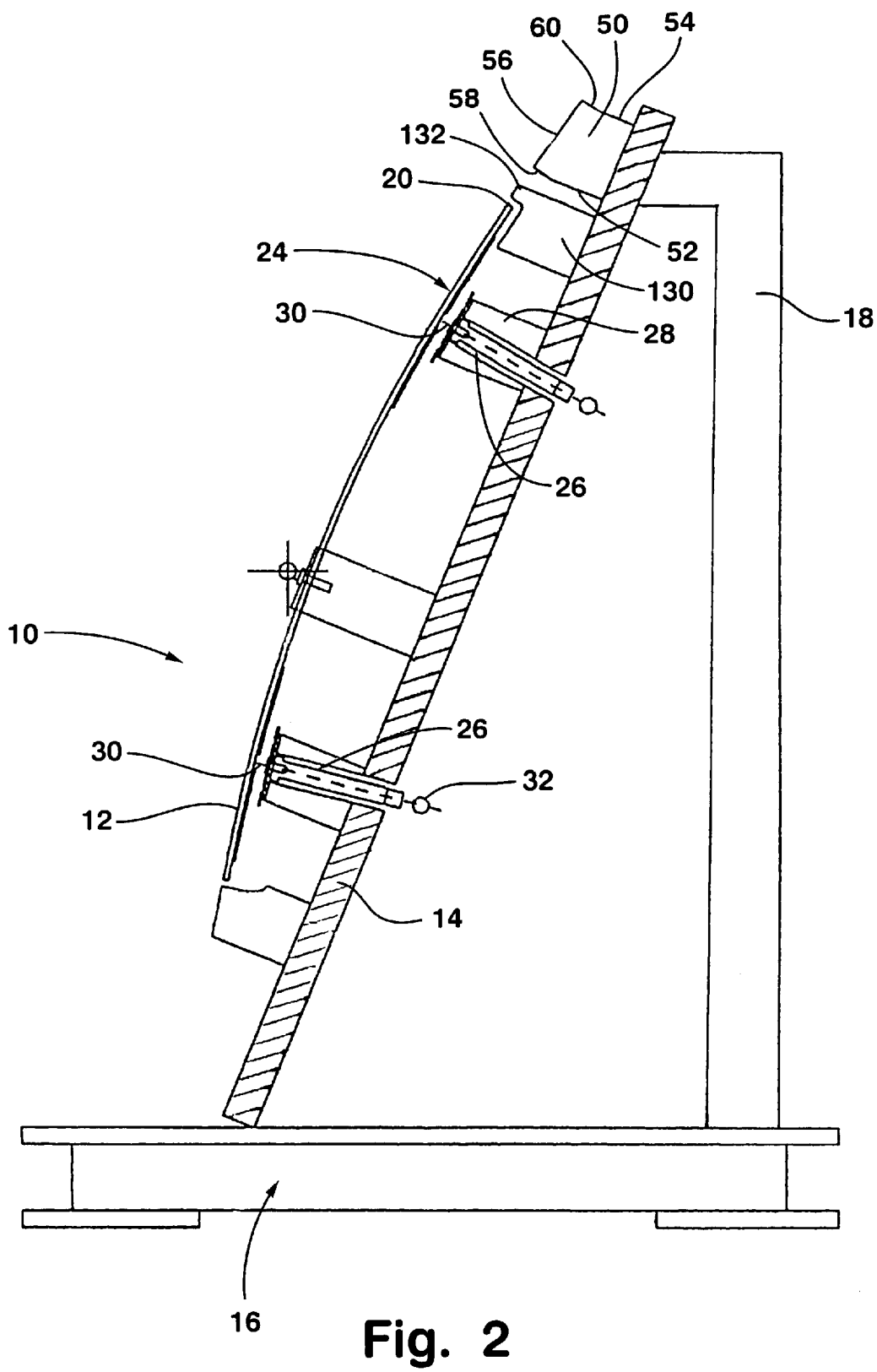
FIG. 2 is a sectional view taken along lines 2—2 of FIG. 1.

Glass sheet 12 illustrated in the drawings has a domed upper surface 24 and is attached to plate 14 by means of one or more mounting devices 26. These are shown schematically in the drawings. The mounting devices 26 include mounting posts 28 on which the product rests and a fastener 30 that attaches the product to the top of the mounting post (FIG. 2). The fastener may be tightened by tightening device 32 on the underside of plate 14 at an accessible location. Three mounting devices 26 are shown in the drawings.

In the illustrated embodiment, the window is secured in place by fasteners 30 that extend through openings that are included in the window in normal production manufacture, so no additional openings have to be formed in the window. With other products, other similar types of securing devices can be used to secure the test products in the same positions.

The position of the window 12 in the illustrated embodiment is accurately established by a plurality of "net pads" 42, 44, and 46, which are accurately positioned part contact surfaces or blocks mounted on vertically positioned rail 34 at the right side of the window and horizontal rail 36 at the bottom of the window (FIG. 1 orientation). Edges 38 and 40 of the window abut inner edges of the net pads 42, 44 and 46. These net pads are set at predetermined locations.

A rail 50 is mounted on an upper surface of plate 14 at a peripheral edge of the window that is to be measured. The rail 50 follows the contour of edge 20 of the window and is spaced a predetermined distance away from the window edge. Rail 50 defines a guide path for the measuring device of the present invention. While a rail is preferred, other types. of fixed guide paths, such as a groove in the mounting plate, could be employed.

Rail 50 has front and rear sides 52 and 54 which extend upwardly from plate 14 and generally perpendicular to the plate. Sides 52 and 54 preferably are parallel and are spaced an equal distance apart. A top 56 of the rail is machined so that it is parallel to and preferably coplanar with the portion of the upper surface of the glass plate adjacent to the rail. Upper portions 58 and 60 of the sides 52 and 54 of the rail are generally perpendicular to top 56 and thus are positioned at an angle with respect to the lower portions of sides 52 and 54. Upper portions 58 and 60 are generally perpendicular to the plane of the adjacent glass surface. Guide rail 50 desirably is formed from steel and is formed with a CNC machine so as to have the same interior contour as the edge of the product being tested.

Figure 5:
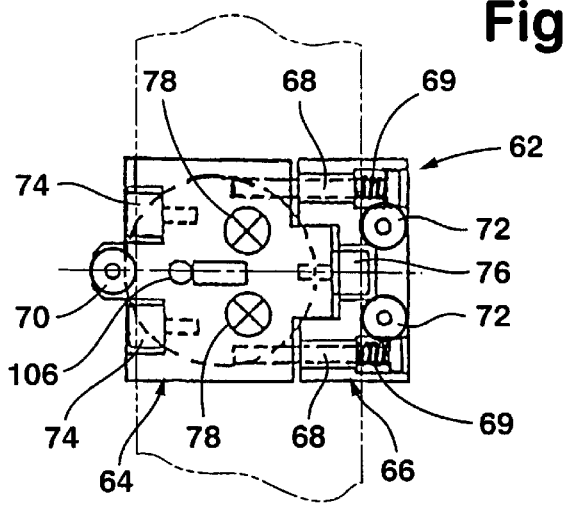
FIG. 5 is a plan view of the underside of the movable car on which the position sensor is mounted.

One or more position-sensor mounting mechanisms in the form of a slidable car 62 is mounted on the top of guide rail 50 (FIG. 5). Each car comprises plates 64 and 66 which are bolted together by bolts 68. Springs 69 permit limited resilient separation of the plates. Cam followers 70 and 72 (comprising wheels mounted on axles) extend downwardly from the outer edges of plates 64 and 66 and abut respectively surfaces 58 and 60 on the guide rail. Springs 69 urge the cam followers into snug engagement with opposite sides of the rail. Cam followers 74 and 76 are positioned adjacent the top of rail 50 and provide for rolling engagement of the plates 64 and 66 along the top of the rail. A pair of magnets 78 are positioned in one of the plates 64 above the top of the rail. The plates are desirably formed of aluminum, and magnets 78 attract the top of the rail and hold the plates downwardly flush against the top of the rail. The car, thus constructed and mounted, rides smoothly along the rail at a predetermined position with respect to the product being tested.

Figure 4:
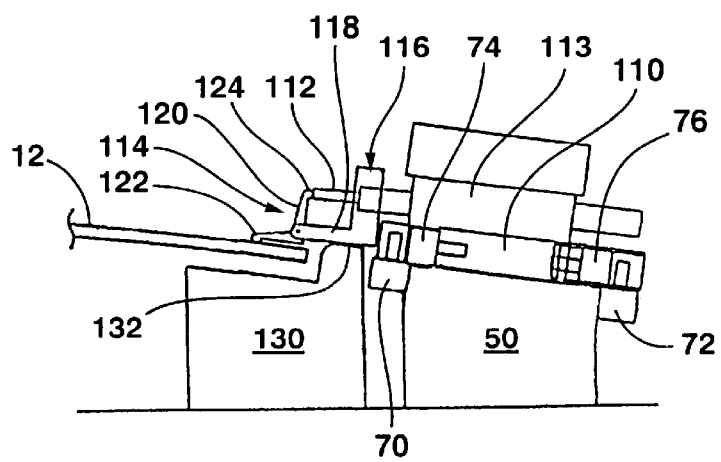
FIG. 4 is a cross-sectional view of the same type shown in FIG. 3 showing the sensor for measuring the surface height of the product.
Figure 3:
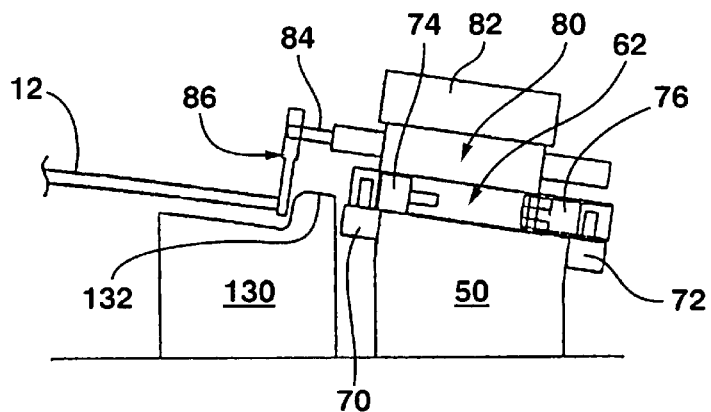
FIG. 3 is a cross-sectional view showing the sensor for measuring the edge of the product mounted on the guide rail.
Figure 6:
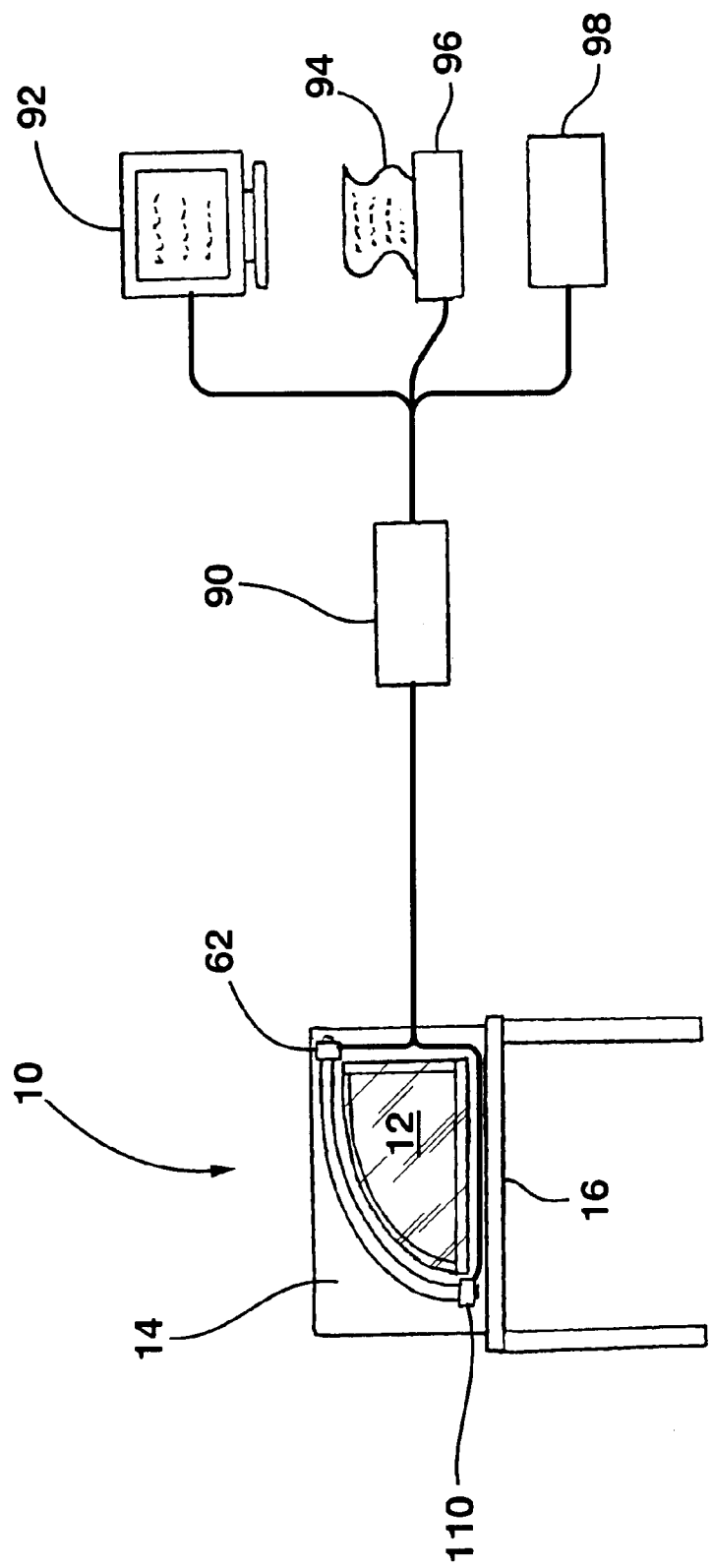
FIG. 6 is a schematic view showing the utilization of the dimension data with a computer system.

A position indicating device 80 is mounted on the top of plate 64. Device 80 includes an indicator 82 at the top and an extendable probe 84 for linear movement in and out in a direction perpendicular to the edge of the plate and parallel to the surface of the plate, as shown in FIGS. 3 and 4. The probe tip extends from the sensing device and is resiliently biased toward an extended position. An edge indicator tip 86 is mounted on an outer end of probe 84 and extends downward to a position where it is adjacent to edge 20 of the window. As car 62 is moved along guide rail 50, indicator tip 86 bears against the outer edge 20 of the window, and the probe is deflected inward and outward as the position of the outer edge varies with respect to the guide rail position. This variation is sensed by the probe, which produces a distance reading representative of the distance of the edge of the product from the guide rail or sensor head. This distance reading can be a specific distance measurement indicated on the sensor head 80 attached to the guide rail, or the probe can be a component of an electronic sensor that produces an electrical signal representative of the probe position, in which case the electronic signal can be displayed at the indicator location or it can be transmitted to a computer 90 and thereafter displayed on a monitor 92, printed in a paper report 94 by a printer 96, or stored electronically in memory 98, as shown in FIG. 6.

A set block 100 positioned on mounting plate 14 adjacent the end of guide rail 50 is used for establishing a base or reference measurement for probe 84.

While the movement of probe 84 along the edge 20 of the glass as the car is moved along guide rail 50 will produce a continuous output reading, it is preferable to have discrete readings at specific points along the guide rail. In order to accomplish this, indentations 104 are formed at discrete locations along the guide rail, and spring-mounted detents (e.g. ball bearings) 106 positioned in openings in the underside of plate 64 of the car engage the indentations and stop the car at each of the locations 104 along the guide rail. At each location, the measurement data is recorded, so as to produce a discrete and repeatable number of product measurements along the guide rail.

Probe 84 attached to car 62 is designed to sense the position of the edge of the glass plate 12. It is also important to detect the vertical position of the glass plate. This is accomplished by mounting a surface measuring probe 112 on a separate car 110 of the same configuration as car 62, or by replacing the edge measuring probe 84 with the surface measuring probe 112 on car 62. A probe 112 of the same type as probe 84 is employed as a sensing element with this sensing device 113. Probe 112, however, is connected to an indicator tip or attachment 114 that makes the probe capable of sensing the surface position of the glass as opposed to the edge position. Indicator attachment 114 comprises an L-shaped collar 116 mounted in a fixed position in the sensor mechanism. A lower arm 118 extends outwardly over the surface of the glass, and an L-shaped pivot link 120 is mounted at an elbow in the link to arm 118. A lower end or ann 122 of the link bears against upper surface 24 of the glass, while an upper end or armi 124 bears against the end of probe 112. As the position of the glass varies with respect to the indicator mechanism, arm 122 pivots upward and downward, and this translates or converts into horizontal movement of arm 124 and a linear movement of probe 112. Thus, vertical position of the glass can effect linear movement of the probe in order to create an output signal representative of the vertical position of the upper surface of the glass. The signal produced by probe 112 can be displayed, stored, or manipulated the same manner as the signal produced by probe 84. A set block 126 mounted on the mounting plate provides a reference location for an initial reading for the glass surface probe.

In operation, a sample glass window taken from a production line is mounted in the mounting fixture by mounting devices 26, with edges 38 and 40 abutting alignment blocks 42, 44, and 46. Cars 62 and 110. are then moved along guide rail 50 and stopped at each indentation location 104 with their respective probes in contact with the mounted window. Measurements are taken at each of these locations and preferably electronically transmitted for display, storage, and manipulation. By simply sliding each of the cars around the guide rail, a complete range of data on the edge position and surface position of the glass can be obtained in a very short period of time and the window can be removed from the apparatus. This data can be visually examined in order to determine the variation that occurs among different windows that are produced on the production line and it can be used to determine if for any reason the manufacturing process is altering window shape to a point where the windows are no longer within manufacturing tolerances. The computer can be programmed to automatically generate a signal to indicate whether a part is within or outside of manufacturing specifications or to indicate any changes in the production dimensions of the windows. All of this data can be stored for electronic or visual manipulation, recreation, or examination.

With the present invention, a window can be measured at a plurality of locations rapidly and with great repeatability. This procedure can be followed so quickly that a large number of test samples can be examined from any batch and, if necessary or desirable, all of the products can be tested. With prior manual measuring techniques, the expense and non-repeatability of manual measuring techniques made measuring each product expensive and often limited measurements to occasional spot checks. With the high repeatability of the present invention, the data is so comparable that computer analysis of the test data can be employed for a variety of purposes as discussed above.

While the movable car mechanism alone is sufficient to take measurements from the test parts in the present invention, the movable car mechanism can also accommodate the redundant use of a known manual measurement device called a "flush and feeler" system. In such a system, rails 130 are positioned below the edges of the part. Raised ridges 132 on the rails follow the contour of the part and extend upwardly to a top surface that is flush with the top of the part. The inside edges of the ridges are formed so as to be five millimeters from the edge of the part. The size of the part can thus be checked with a "Go-No/Go" feeler gauge manually inserted between the ridge and the edge of the part.

It should be understood that the embodiments disclosed herein are merely exemplary of the preferred practice of the present invention and that various changes and modifications in the arrangements and details of construction of the embodiments shown herein without departing from the spirit and scope of the present invention, as defined in the appended claims.

We claim:

1. A test fixture for rapidly checking the measurements of identical parts at various selected points on a non-linear contour of the parts comprising:

mounting means for releasably mounting parts securely in a predetermined position;

a rail that extends past the selected points of the part, the rail being positioned adjacent the outer periphery of the part and having a non-linear contour that conforms generally with the non-linear contour of the part;

sensor mounting means mounted on the rail for movement past said selected points of the part, the sensor mounting means comprising a car that rides on and is supported substantially exclusively by the rail, the car being supported on the rail such that the engagement between the car and the rail maintains the car continuously in alignment with the rail along the non-linear contour of the rail; and sensor means mounted on the sensor mounting means for detecting the position of the selected points on the part relative to the position of the sensor mounting means as the sensor mounting means moves along the rail.

2. A test fixture for rapidly providing repeatable part measurements at multiple locations along a non-linear test point path on a plurality of identical parts, comprising:

a base;

a mounting means on the base for mounting parts in a predetermined position on the base without obstructing any surfaces to be measured;

a rail mounted on the base adjacent the position where the parts are mounted, the rail having a non-linear contour that conforms with the contour of the test point path, such that the rail is substantially parallel to the test point path;

a car mounted on and supported substantially exclusively by the rail for movement along the rail, the car being mounted on the rail such that engagement between the car and rail maintains the car in aligment with the rail as the car moves along the non-linear contour of the rail; and position sensor means mounted on the car for detecting the position of multiple locations on each part in relation to the rail as the car moves along the rail past the multiple locations.

3. A test fixture as in claim 2 wherein the position sensor means provides an electronic output and the test fixture further includes means for displaying or recording the output for each selected location.

4. A test fixture as in claim 2 and further comprising resilient stop means for stopping the car at specific points on the rail, such that measurements can be taken consistently from the same points on the rail.

5. A test fixture as in claim 4 wherein the stop means comprises a spring mounted detent in the car that engages a plurality of indentations in the rails.

6. A test fixture as in claim 2 wherein the car is mounted on the rail on rotatable wheels, the rail having opposite sides and the car including portions that fit over and engage the opposite sides of the rail so as to maintain the car at a predetermined lateral position with respect to the rail as the car moves along the rail.

7. A test fixture as in claim 6 wherein the car includes wheels that are positioned to engage an upper surface of the rail and the opposite sides of the rail.

8. A test fixture as in claim 7 wherein the wheels on the opposite sides of the rail are mounted in the car for resilient lateral movement with respect to each other, such that the wheels snugly engage the rail but are resiliently separable to some extent.

9. A test fixture as in claim 2 wherein the position sensor means comprises a movable probe extending between the car and the part that resiliently engages the part at selected locations on the test point path, the position of the probe at said selected locations being indicative of the shape of the part.

10. A test fixture as in claim 9 wherein the part is formed of material having a peripheral edge around a surface of the material, the position sensor means including a probe that engages the periphery of the part so as to measure the position of various points on the periphery of the part.

11. A test fixture as in claim 9 wherein the part is formed of material having a peripheral edge around a surface of the material, the position sensor means including a probe that engages the surface of the part so as to measure the position of various points on the surface of the part.

12. A test fixture as in claim 9 wherein the part has a surface and peripheral edge, the rail extending along the edge of the part at a predetermined distance therefrom, the sensor including a probe that is movably mounted in the car and is resiliently urged toward an extended position, the probe yieldingly engaging the part as the car moves along the rail, providing a plurality of position readings as the car is moved along the rail.

13. A test fixture as in claim 12 wherein the sensor includes separate probes, one probe engaging the peripheral edge of the part and a second probe engaging the surface of the part, the probe either being mounted on separate cars or being replaceably mounted on the same car.

14. A test fixture for rapidly providing repeatable part measurements at multiple locations on a plurality of identical parts wherein each part comprises a window having a peripheral edge and a non-planar surface, the test fixture, comprising:

a base;

mounting means on the base for mounting the window in a generally flat position on the base without obstructing any surfaces to be measured;

a rail mounted on the base adjacent the window at the outer periphery thereof, the rail having equally spaced front and rear upright surfaces and a top surface positioned between the front and rear surfaces at the top of the rail, the top surface being contoured at the same slope as the slope of the surface of the window adjacent the rail;

a car mounted on the rail for movement along the rail, the car riding on the top surface of the rail and including downward extending cam rollers that engage the front and rear surface of the rail and position the car at a consistent transverse position on the rail, the cam rollers further permitting the car to roll along the rail, the sloped top of the rail positioning the car at a consistent inclination with respect to the slope of the surface window adjacent the edge thereof; and position sensor means mounted on the car for detecting the position of multiple locations on each part in relation to the rail as the car moves along the rail past the multiple locations, the sensor including a probe mounted in the car and resiliently urged outwardly toward the edge of the window, engagement with the window causing the probe position to change to reflect the relative position of the window with respect to corresponding locations on the car, the sensor producing a detectable output indicative of the relative positions of the multiple points on the window, the rail being mounted on the plate at the outer periphery of the window, the rail having equally spaced front and rear upright surfaces and a top surface positioned between the front and rear surfaces at the top of the rail, the top surface being contoured at the same slope as the slope of the surface of the window adjacent the rail.

15. A test fixture as in claim 14 wherein the probe is movable in a direction perpendicular to the edge of the window and parallel to the plane of the window surface at the edge of the window, the probe engaging the edge of the window as the car is moved around the periphery of the window, the probe thus measuring the outer edge dimension of the window.

16. A test fixture as in claim 14 wherein the probe is mounted in the car for linear movement in the plane of the window adjacent the edge and in a direction perpendicular to the edge of the window, pivot link means being attached to the sensor at a fixed pivot axis, for causing the vertical position of the window surface to be reflected in the linear position of the probe, the probe and link means thus measuring the window surface position around the periphery of the window.

\* \* \* \* \*